United States Patent
Norton et al.

[15] 3,684,014
[45] Aug. 15, 1972

[54] POLYACRYLAMIDE-POLYALKENEOXIDE MOBILITY CONTROL PROCESS

[72] Inventors: Charles J. Norton, 766 Marion, Denver, Colo. 80218; David O. Falk, 3284 S. Winona Court, Denver, Colo. 80212

[22] Filed: Oct. 29, 1970

[21] Appl. No.: 85,064

[52] U.S. Cl. ............... 166/275, 166/252, 166/273, 252/8.55 D
[51] Int. Cl. ............................................. E21b 43/22
[58] Field of Search............ 166/275, 278, 273, 252; 252/8.55 D

[56] References Cited

UNITED STATES PATENTS

| | | |
|---|---|---|
| 3,402,137 | 9/1968 | Fischer et al........166/275 UX |
| 3,336,977 | 8/1967 | Amott......................166/274 |
| 3,343,601 | 9/1967 | Pye.........................166/275 |
| 3,367,418 | 2/1968 | Routson....................166/274 |

*Primary Examiner*—Stephen J. Novosad
*Attorney*—Joseph C. Herring, Richard C. Willson, Jr. and Jack L. Hummel

[57] ABSTRACT

Improved viscosity, resistance factors, and mobility control of aqueous polyelectrolyte solutions are obtained by incorporating synergistic amounts of polymers containing non-polyelectrolyte, example of such a solution is 400 ppm of partially hydrolyzed polyacrylamide and 100 ppm of polyethylene oxides.

14 Claims, 2 Drawing Figures

FIGURE 1. BLENDS OF POLYETHYLENE OXIDE (PO) AND PARTIALLY HYDROLYZED POLYACRYLAMIDE (PH PA) IN SOFT WATER EXHIBIT SYNERGISM ON VISCOSITY AND ON SCREEN FACTOR.

O = VISCOSITY
Δ = SCREEN FACTOR

FIGURE 2. RECIPROCAL MOBILITY VALUES FOR PARTIALLY HYDROLYZED POLYACRYLAMIDE (250 PPM) (PH PA) AND (250 PPM) POLYETHYLENE OXIDE (PO).

POLYACRYLAMIDE-POLYALKENEOXIDE MOBILITY CONTROL PROCESS

CROSS-REFERENCES TO RELATED APPLICATIONS

The following cases relate to the same general field as that of the present invention: U. S. Pat. No. 3,507,331 U.S. Pat. No. 3,467,187; Ser. No. 74,336 filed 9/22/70; Ser. No. 76,140 filed 9/28/70; Ser. No. 67,726 filed 8/28/70; Ser. No. 79,591 filed 10/9/70; Ser. No. 126,731 filed 3/22/71; Ser. No. 133,060 filed 4/12/71; Ser. No. 140,931 filed 5/6/71; and Ser. No. 209,479 filed 11/26/71.

BACKGROUND OF THE INVENTION

1. Field of the Invention

The present invention relates primarily to wells classified in Class 166 of the U.S. Pat. Office, and more particularly to a production of earth fluid by driving fluid classified in Class 166 subclass 252.

2. DESCRIPTION OF THE PRIOR ART

Non-polyelectrolytes, e.g., polyalkeneoxides such as polyethylene oxides, are described in the Union Carbide Corporation bulletins on their product Polyox, (Registered trademark of the Union Carbide Co.) e.g., their Bulletin F–40246E, 10M–1968. The use of polyelectrolytes, e.g., polyacrylamides, especially for the preparation of displacement fluids for use in secondary and tertiary recovery of petroleum from subterranean formations has been taught in a variety of prior art patents. U. S. Pat. No. 3,039,529 teaches selectively partially hydrolyzed polyacrylamides but presents no specific information relative to polyacrylamides and polyalkeneoxides mixed; U. S. Pat. No. 3,208,518 teaches that polymer solutions are less viscous and more injective at pH below 5; U. S. Pat. No. 2,827,964 teaches partially hydrolyzed polyacrylamides but mentions no mixture of polyacrylamides and polyalkeneoxide; U. S. Pat. No. 3,002,960 prepares polyacrylamides for well injection to be resistant to connate brine and to absorption on formation rock but makes no mention of polyalkeneoxide; U. S. Pat. No. 3,074,481 is primarily concerned with well patterns and mentions no polyalkeneoxide; U. S. Pat. No. 3,139,929 is also primarily concerned with flooding geometry and use of water-soluble polymers thereof; U. S. Pat. No. 3,210,310 teaches in situ polymerization to give partial plugging around a well bore but mentions no polyalkeneoxide; U. S. Pat. No. 3,476,186 teaches flooding with acrylic acid-acrylamide-diacetone acrylamide copolymer but mentions no polyalkeneoxide. Moreover, factors influencing mobility control by polymer solutions are discussed in Paper No. SPE 2867 of the Society of Petroleum Engineers of the American Institute of Mining Engineers, which paper also describes the screen viscometer and screen factor translator of this application. However, none of the prior art, to the best of our knowledge, teaches the improved resistance factors (screen factors) and mobility control of aqueous polyacrylamide solutions obtained by mixing synergistic amounts of polymers containing alkeneoxides, as included within the present invention.

SUMMARY

General Statement of the Invention

Both polyelectrolytes and non-polyelectrolytes, e.g., partially hydrolyzed polyacrylamides, polyalkeneoxide polymers and polyalkeneoxides, have been used as "thickening agents" to increase the viscosity of liquids, primarily displacing liquids for use in secondary petroleum recovery. Such uses are taught, e.g., in the aforementioned U. S. Pat. No. 3,039,529 and in U. S. Pat. No. 3,116,791 respectively. Such polymers and oxides, i.e., partially hydrolyzed polyacrylamides, polyalkene, and polyalkeneoxide, decrease the mobility of the displacing liquids to improve their efficiency in displacing oil-in-place from formations and moving the oil toward production wells. Decreasing the mobility of the displacing fluids minimizes "fingering" or channeling of a displacing fluid through the body of Oil-in-place in the formation.

A laboratory method for obtaining a measure of the relative mobility of fluids is described in the American Institute of Mining Engineers' paper "Factors Influencing Mobility Control by Polymer Solution" by R. R. Jennings, J. H. Rogers, and T. J. West, SPE Paper No. 2867 prepared for the Ninth Biennial Production Techniques Symposium, held in Wichita Falls, Tex., May 14–15, 1970.

In the testing, the liquids flow through screens and the ratio of the time required for the test solution to flow through the "screen viscometer" divided by the time required for a standard solvent (water) to flow through the viscometer is termed the "screen factor."

According to the present invention, the "screen factor" and mobility control of aqueous solutions of polyelectrolyte, e.g., partially hydrolyzed polyacrylamides, can be inexpensively and effectively increased by the addition of a non-polyelectrolyte, e.g., polyalkeneoxide, having a molecular weight in the range of from about $10^4$ to about $10^8$, more preferably from $10^5$ to about $10^7$, and most preferably from $1 \times 10^6$ to about $6 \times 10^6$. The present invention is useful with any of the general class of partially hydrolyzed polyacrylamides. The preferred polyacrylamides have molecular weights of from 0.1 – 100 million and more preferably from 1 – 10 million and most preferably from 3 – 6 million and are hydrolyzed from 1 to about 60 percent, more preferably from 10 to about 30 percent of maximum hydrolysis.

As mentioned above, the process and compositions of the present invention are useful for the decreasing of mobility of liquid solutions especially for use in the secondary and tertiary recovery of petroleum by displacement of oil-in-place from subterranean oil-bearing formations. In general, the techniques of secondary and tertiary recovery are applicable to the use of the invention and standard works such as *Secondary Recovery* by C. R. Smith, (Reinhold, 1966) should be consulted in this connection.

BRIEF DESCRIPTION OF THE DRAWINGS

FIG. 1 is a plot of Reciprocal Mobility Values for Water Thickeners versus Throughput, Pore Volumes.

DESCRIPTION OF THE PREFERRED EMBODIMENTS

Starting Materials

Figure 1:
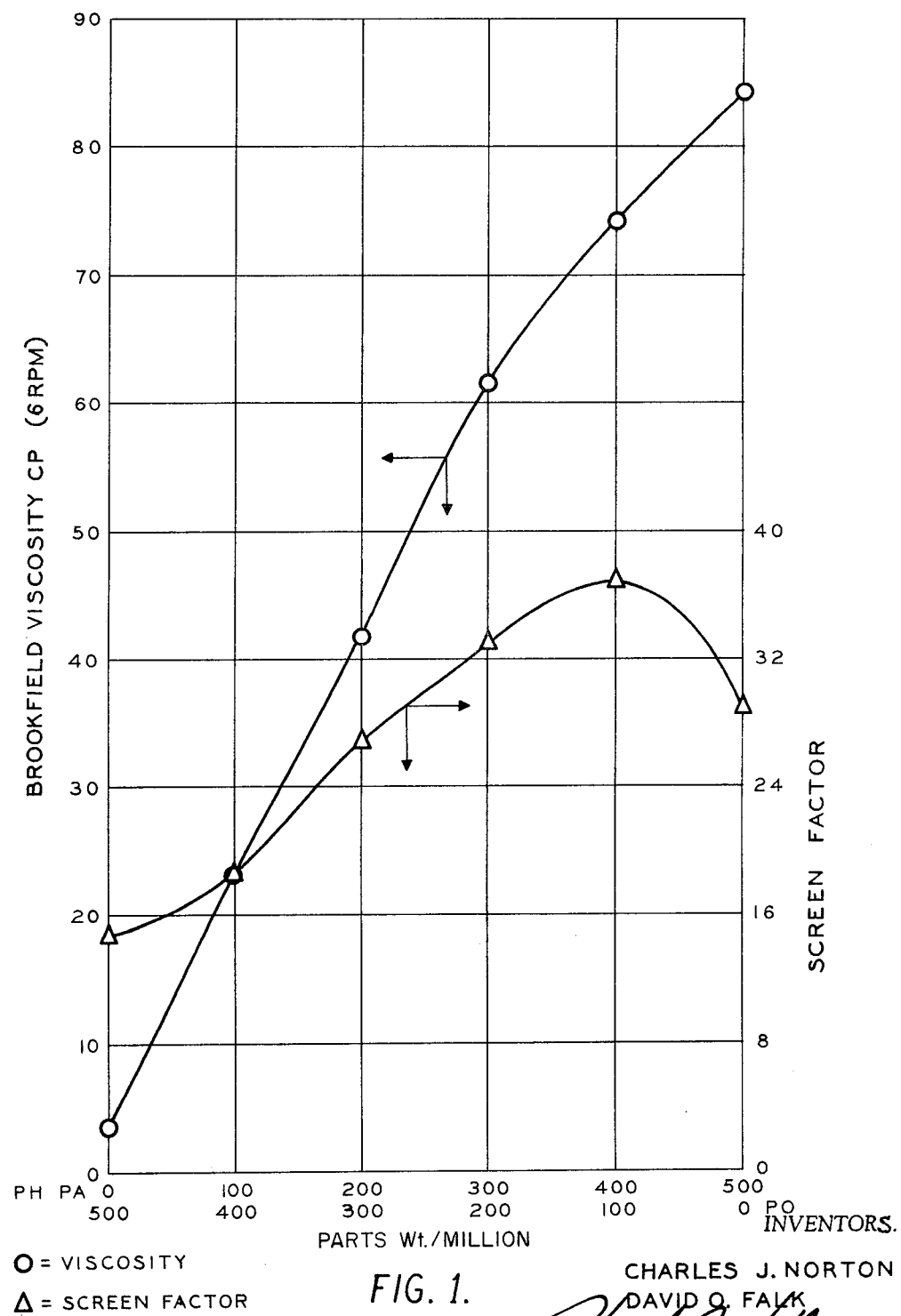
FIG. 1 is a plot of "screen factor," versus polyethylene oxide (PO) at various levels of parts per million of partially hydrolyzed polyacrylamide (PHPA).

As mentioned above, the polyacrylamides will preferably have molecular weights in the range of from about 0.1 to about 100 million, more preferably from 1 to 10 million, and most preferably from 3 to 6 million and will be hydrolyzed, preferably from 1 to 60 percent of maximum hydrolysis, and more preferably from 10 to 30 percent of maximum hydrolysis. Preferably the polyacrylamides will be present in amounts of from 0.001 to about 10.0, more preferably from 0.01 to about 1.0, and most preferably from 0.02 to about 0.2 weight percent based on the weight of the total solution.

The polyalkeneoxides will preferably have molecular weights in the range of from about $10^4$ to about $10^8$, more preferably from $10^5$ to about $10^7$, and most preferably from $1 \times 10^6$ to about $6 \times 10^6$. Preferably, the polyalkeneoxides will be present in amounts of from 0.001 to about 10, more preferably from 0.01 to about 1.0, and most preferably from 0.02 to about 0.2 weight percent based on the total solution.

The amount of partially hydrolyzed polyacrylamide will generally be in the range of from about 1 to 10,000 more preferably about from 1 to 5,000, and most preferably about 250 to 500 parts by weight per million parts of solution. The amount of polyalkeneoxide will generally be in the range of from about 1 to 10,000, more preferably from about 1 to 5,000, and most preferably about 1 to 250 parts by weight per million parts of solution.

By "polyalkeneoxide" is meant herein any of the polymeric water-soluble resins prepared by polymerization or copolymerization of alkene oxides, for example ethylene oxide, propylene oxide, butylene oxides, having polymer molecular weights of $10^4$ to $10^8$. While any of the polymerized alkene oxides may be employed in the practice of the invention, it is preferred to employ polymerized ethylene oxide. This product is made commercially by Union Carbide Chemicals Company under the trade name "Polyox."

The solvent for the liquid solutions of the present invention will comprise water, most preferably consist essentially of connate water, e.g., Palestine line water, fresh water, or brackish water. It is preferable that the water contain less than about 300,000, more preferably less than about 10,000, and most preferably less than about 500 parts per million of dissolved solids.

While not necessary to the practice of the present invention, various other ingredients including among others, cellulose and surfactants, e.g., polyalkylaryl sulfonates and other conventional displacement fluid additives may be added to the liquid polymer solutions. In addition to polyalkeneoxides, other viscosity increasing agents, e.g., carboxymethylcellulose, and biopolymers may be employed. Any of the aforementioned specific ingredients may be employed in admixture.

Preparation of Liquid Systems

It will generally be preferable to merely co-mix the non-aqueous polyacrylamide and polyalkeneoxide and then add water while gently stirring to promote dispersion, suspension, and dissolving by bubbling a small amount of non-oxygen gas, e.g., natural gas. The ingredients will preferably be mixed at a temperature somewhat above room temperature, more preferably from 0° C. to about 100° C., and most preferably from 20° C. to about 50° C. If desired, a mixing operation can be employed in one or more full-type mixers or mixing tees so long as the proportions of the ingredients are properly measured and thoroughly mixed.

EXAMPLE

Three, 3-inch diameter by 4-foot long Berea sandstone cores were prepared by procedure summarized in Table 1. The preparative core data indicate that the pore volumes and porosities are comparable. The comparative "secondary" waterflood also gave very closely comparable initial oil ($O_i$), water ($W_i$) saturations, residual oil ($O_r$) and water ($W_r$) saturations, and efficiencies of oil recovery (Eff.) for these three secondary waterflood floods.

Three thickened waters were prepared by dissolving (1) 500 ppm Dow 700 partially hydrolyzed (15–20 percent) polyacrylamide of $3.6 \times 10^6$ gram-molecular weight (gmw), (2) 250 ppm Dow 700 and 250 ppm Polyox coagulant of $5 \times 10^6$ gmw, and (3) 500 ppm Polyox coagulant, each respectively in synthetic Palestine water. After solution, up to 1.00 pore volume of each of these thickened waters was used to carry out the tertiary flood.

Each core was equipped with pressure transducers at the front end, middle and end of the core and a history of readings was taken as the injection proceeded.

Figure 2:
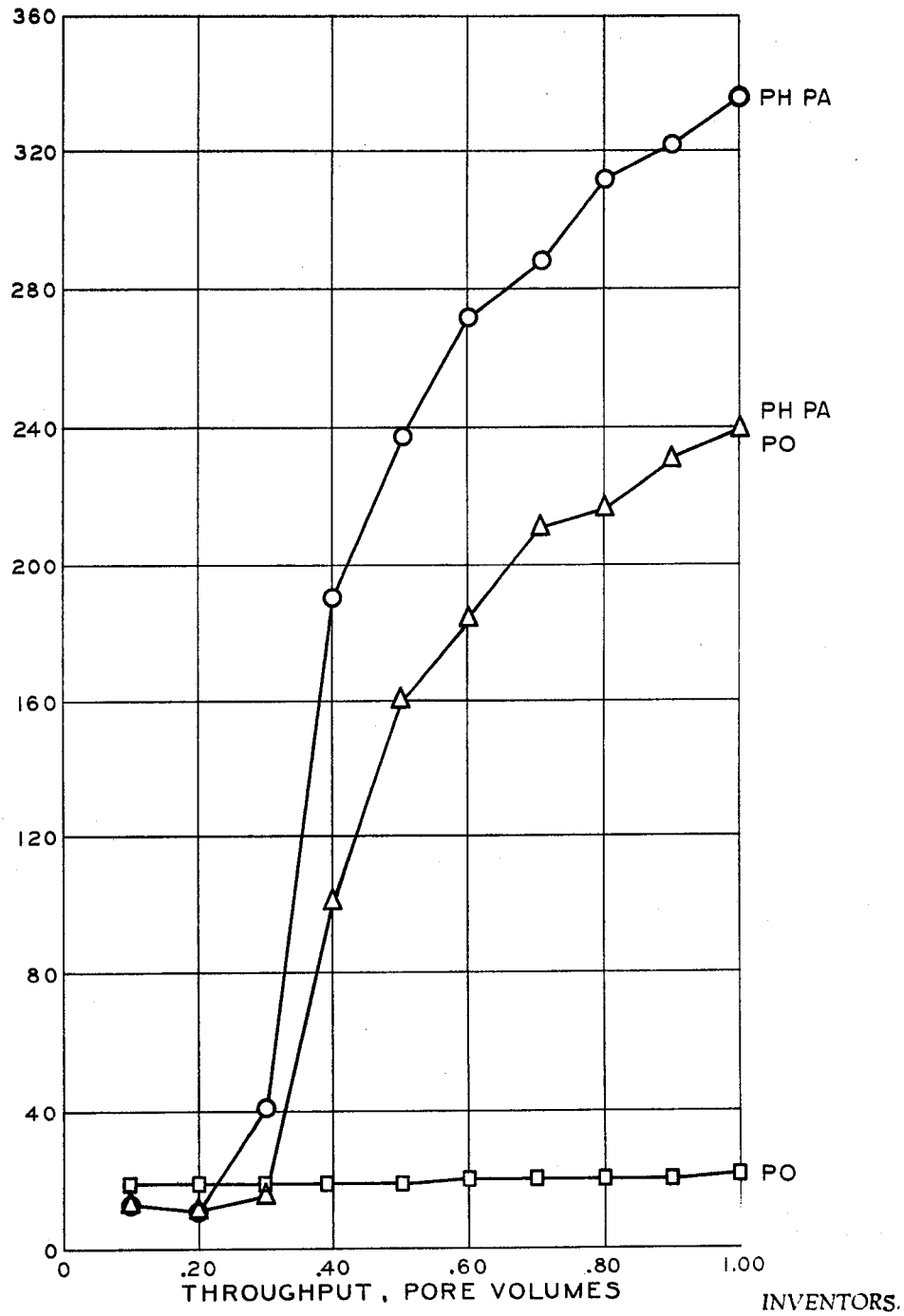

On FIG. 2, the reciprocal mobility values calculated by means of the Darcy equation, $$\text{reciprocal mobility} = \frac{kA(\Delta P)}{ql}$$

where $k$ is the permeability, $A$ the cross-sectional area in cm$^2$, $\Delta P$ the pressure change in atmospheres, $q$ the throughput flow rate in cm$^2$/sec, and $l$ is the length of the core. The reciprocal mobility measured at the front (injection port) shows pronounced synergistic effect of Polyox (PO) on Dow 700 (PHPA) over the region 0.00 – 0.60 PV. Synergism becomes apparent at the middle and terminal port after 0.40 pore volume has been injected. The effectiveness of this reciprocal mobility maintenance was also reflected in synergistic improvement in oil production for 0.5 to 0.8 pore volume of 250 ppm PO — 250 ppm Dow 700 thickened water injection.

TABLE 1.—PREPARATION OF CORES FOR THICKENED WATER FLOODS

| | Core data | | | "Secondary" water flood [1] | | | | | Tertiary flood with water thickener (500 p.p.m.) |
|---|---|---|---|---|---|---|---|---|---|
| Run No. | PV, cc. | Porosity | Permeability, md. | $O_i$ | $W_i$ | $O_r$ | $W_r$ | Percent eff. | |
| 09009 | 1,032 | 0.200 | 413.3 | 0.633 | 0.367 | 0.372 | 0.628 | 44.2 | PHPA. |
| 09010 | 1,062 | 0.206 | 365.9 | 0.627 | 0.374 | 0.370 | 0.630 | 41.0 | {250 p.p.m. PHPA. 250 p.p.m. PO. |
| 09011 | 1,070 | 0.208 | 323.1 | 0.593 | 0.407 | 0.358 | 0.642 | 39.6 | PO. |

[1] 4 ft. x 3 in. Berea fired at 825° F., saturated with Henry brine (11,000 p.p.m. Cl⁻, 6,500 p.p.m. Na⁺, 276 p.p.m. Ca⁺⁺, 167 p.p.m. Mg⁺⁺) and Henry Crude to oil initial ($O_i$) and water ($W_i$); subsequently water flooded to residual saturations ($O_r$ and $W_r$) znd then flood at rates of 3.7 (day) and 1.9 (night) ft./day with synthetic "Palestine Water" containing 400 p.p.m. NaCl and 65 p.p.m. CaCl₂ and 500 p.p.m. thickener.

As shown in FIG. 2, a plot of reciprocal mobility value versus the pressure as shown at a transducer located approximately one-half the length of the core from the injection point, on the cores used in the preceding example, the pressure increases unusually in the range of from about 0.30 to about 1.00 and most particularly in the range of from 0.4 to 0.9 pore volumes of throughput. Therefore, it is particularly preferred that the solutions of the present invention be used in these amounts or in conjunction with total solutions which cause the total injection to be in these amounts, in terms of pore volume. Use of the specific ranges of concentration taught in the present specification in combination with the particularly preferred ranges of pore values results in a secondary or tertiary recovery operation of especially unexpectedly high efficiency.

Modifications

It will be understood by those skilled in the art that the polyacrylamides utilized in the examples herein are merely exemplary of the variety of polyelectrolyte permeability modifying agents which may be employed with the present invention. Other such polyelectrolyte permeability modifying agents include derivatives of the partially hydrolyzed polyacrylamides including acrylamides which have been substituted with sulfonate groups, phosphate groups, and other substituents having high ionic charges. Radicals having a high ionic charge are those which retain an electrical charge (either positive or negative) after they have been bonded to the base chain, e.g., polyacrylamide. For discussion of ionic charges see, e.g., any elementary chemistry text. Other modifications of the polyelectrolyte permeability modifying agents can include partially hydrolyzed copolymers of polyacrylamides or their derivatives, e.g., copolymers with vinyl sulfonates, vinyl phosphates, and vinyl acrylates. In general, any water-soluble polyelectrolyte can be employed in the invention, although the partially hydrolyzed polyacrylamides are most preferred.

Similarly, the polyalkeneoxides are merely exemplary of the viscosity increasing agents or thickeners which are to be employed with the present invention. Other suitable viscosity control agents include polysaccharrides, derivatives of such polysaccharrides, e.g., carboxymethylcellulose and other cellulose derivatives, dextran, starch derivatives, etc., and e.g., the especially prepared Polyox and other polyalkeneoxide derivatives taught by our copending U.S. Pat. application, Ser. No. 79,591, filed 10/9/70. In general, any water-soluble agent which increases viscosity may be employed with the present invention although the polyalkeneoxides are most preferred.

A useful modification of the invention is to vary the relative proportions of the polyelectrolyte to the viscosity increasing agent, e.g., using nearly 100 percent polyacrylamide at the leading edge of the displacement slug and gradually using a higher and higher percentage of polyalkeneoxide to provide a slug which is rich in the depletable component, polyacrylamide at its leading edge where depletion is most likely to occur. The initial viscosity of the slug may be the same at all points throughout this slug or may be itself gradually decreased until it approaches that of the drive fluid which displaces the slug through the formation.

Of course, slugs of other displacement fluids, e.g., soluble oils, and other micellar solutions, emulsions, etc. can be injected prior to the fluids of the invention where desirable. Similarly, drive fluids, e.g., water, mobility buffers followed by water, etc., can be injected after the fluids of the present invention. Thus the fluids of the invention can be used to displace slugs of other fluids through the formation and can themselves be driven by other fluids.

What is claimed is:

1. A process for the displacement of oil in oil-bearing formation comprising injecting into said formation an aqueous solution comprising about 0.001 to about 10 percent by weight of a permeability reducing water-soluble polyelectrolyte and 0.001 to about 10 weight percent viscosity increasing water soluble non-polyelectrolyte, wherein said polyelectrolyte comprises partially hydrolyzed polyacrylamide having a molecular weight in the range of from 0.1 to about 100 million.

2. A process according to claim 1 wherein the aqueous solution is about 0.001 to about 10 percent by weight of a permeability reducing water soluble polyelectrolyte and 0.001 to about 10 weight per cent polyalkeneoxide based on the total solution.

3. A process according to claim 1 wherein the aqueous solution is about 0.001 to about 10 percent by weight of a polyacrylamide and 0.001 to about 10 weight per cent polyalkeneoxide based on the total solution.

4. A process according to claim 4 wherein the polyalkeneoxide polymer has a molecular weight above 100,000 prior to co-mixing with said polyacrylamide polymer.

5. A process according to claim 4 wherein the polyalkeneoxide has a molecular weight of from 1 million to about 10 million prior to the addition of the polyacrylamide polymer.

6. A process according to claim 4 wherein the polyalkeneoxide polymer is present in a concentration of from about 0.01 to about 1.0 per cent by weight based on the weight of the total solution.

7. A process according to claim 4 wherein the polyalkeneoxide comprises groups containing the structure:

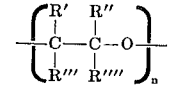

wherein R', R'', R''', and R'''' may be the same or different and are each selected from the group consisting of hydrogen, alkyl, and containing from one to 20 carbon atoms.

8. The compositions of claim 7 wherein R', R'', R''', and R'''' each contain from one to six carbon atoms, the balance of the substituents being hydrogen.

9. A process according to claim 4 wherein the polyacrylamide has a molecular weight in the range of from about 100,000 to about 100 million.

10. A process according to claim 4 wherein the partially hydrolyzed polyacrylamide polymer is present in a concentration of from about 0.01 to about 1.0 per cent by weight based on the weight of the total solution.

11. A process for the displacement of oil in oil-bearing formation comprising injecting into said formation an aqueous composition comprising solutions of 1 – 250 parts per million of polyalkeneoxide and 250 – 500 parts per million of polyacrylamide, said solution being injected in the range of 0.30 to about 1.00 pore volume.

12. In a process according to claim 11 wherein said solution is injected in the range of 0.4 to about 0.9 pore volume.

13. A process for the displacement of oil in oil-bearing formations comprising injecting into said formation an aqueous solution comprising about 0.001 to about 10 percent by weight of a permeability reducing water-soluble polyelectrolyte and 0.001 to about 10 percent viscosity increasing water-soluble non-polyelectrolyte wherein said non-polyelectrolyte comprises polyalkaleneoxide having a molecular weight in the range of from about $10^4$ to about $10^8$.

14. A process according to claim 13 wherein the said permeability reducing water-soluble polyelectrolyte comprises partially hydrolyzed polyacrylamide having a molecular weight in the range of from 0.1 to 100 million.

* * * * *